E. RUEGG.
INCUBATOR AND BROODER.
APPLICATION FILED JUNE 7, 1911.
1,031,150.
Patented July 2, 1912.
2 SHEETS—SHEET 1.
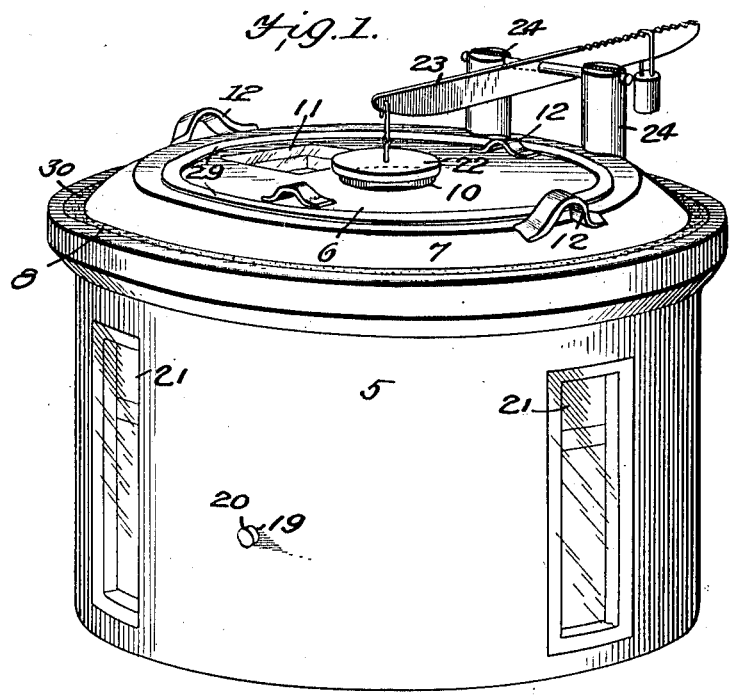
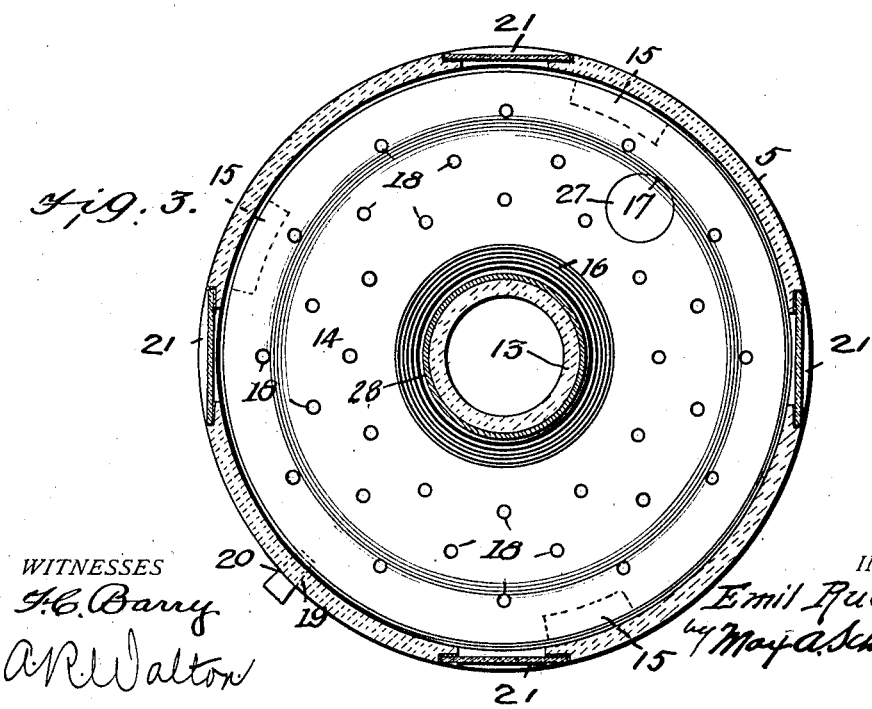
WITNESSES
F. C. Barry
A. R. Walton
INVENTOR
Emil Ruegg
by May A. Schmidt
Attorney

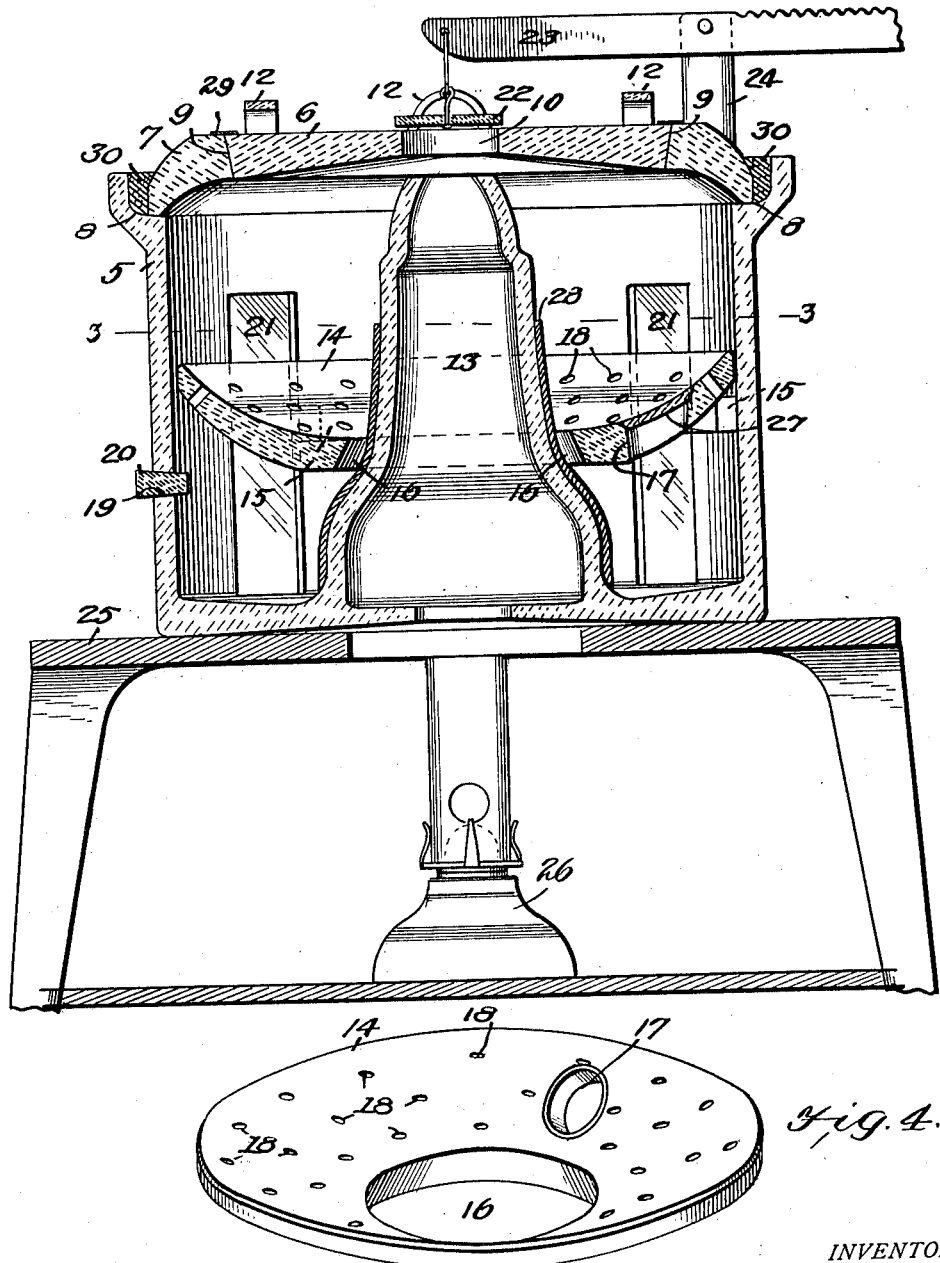

UNITED STATES PATENT OFFICE.

EMIL RUEGG, OF COTMAN, VIRGINIA, ASSIGNOR OF ONE-HALF TO E. A. STUMPF, OF RICHMOND, VIRGINIA.

INCUBATOR AND BROODER.

1,031,150.  Specification of Letters Patent.  Patented July 2, 1912.

Application filed June 7, 1911. Serial No. 631,845.

*To all whom it may concern:*

Be it known that I, EMIL RUEGG, citizen of the Republic of Switzerland, residing at Cotman, in the county of Henrico and State of Virginia, have invented certain new and useful Improvements in Incubators and Brooders, of which the following is a specification.

This invention has reference to incubators of that kind provided with an external source of heat which is carried into the casing of the apparatus by a flue; and it is the object of the invention to provide in an incubator of this kind a novel form of egg-supporting tray which enables the eggs to be readily turned to expose all sides thereof to the heat.

The invention also has for its object to provide an incubator which is simple in construction, all complicated parts being dispensed with, and the entire structure being readily accessible so that it may be easily cleaned.

A further object of the invention is to provide an incubator which is entirely constructed of earthenware.

Other objects and advantages of the invention will appear in the following detailed description of the apparatus, reference being had to the accompanying drawings, in which—

Figure 1 is a perspective view of the incubator. Fig. 2 is a central vertical section thereof, the heating apparatus being also shown. Fig. 3 is a horizontal section on the line 3—3 of Fig. 2. Fig. 4 is a perspective view of the egg-supporting tray.

Referring specifically to the drawings, the casing of the apparatus is a cylindrical vessel 5 having an open top which is closed by a cover 6 and a ring 7. The top edge of the vessel has a rabbet 8 in which the ring 7 seats, and within the latter the cover 6 snugly fits, the edge of the cover and the ring being beveled as indicated at 9 to provide a tight joint and to prevent the cover from dropping through the ring. The cover has a central opening 10, and to one side thereof is another opening 11 in which is fitted a pane of glass. To facilitate their removal from the vessel, the ring and cover are provided with handles 12.

In the vessel 5 is a vertical heating flue 13 which opens through the bottom of the vessel, and from which latter it rises at the center thereof, in line with the opening 10. The flue extends up to within a short distance from the cover 6, its upper end being open and located directly under the opening 10. In the vessel 5 is also located an egg tray 14 which is loosely supported on lugs 15 formed on the side wall of the vessel, so that it may be removed. The tray has a central opening 16 so that it may be slipped over the flue 13, and to one side of this opening is an opening 17 through which the chicks can escape into the lower portion of the vessel, it being understood that the egg tray is located a suitable distance above the bottom of the vessel so that a nursery compartment for the chicks is had beneath the tray. The tray also has perforations 18, and in the side wall of the vessel is a ventilating opening 19 provided with a suitable closure 20. The side wall of the vessel is also provided with a number of openings 21 which are covered with glass. Over the opening 10 is located an automatic damper 22 carried by a counterweighted lever 23 supported by posts 24 rising from the ring 7. This damper operates in the ordinary manner to regulate the temperature of the apparatus.

The entire apparatus herein described, except the temperature regulator, is made of glazed or partly glazed earthenware which retains the heat, and also enables the apparatus to be thoroughly cleaned, the egg tray being removable from the vessel for this purpose.

In use, the vessel 5 is placed on a suitable support 25 over a lamp or other heating medium 26. The hot air enters the vessel through the flue 13, the vessel being so located that the flue is directly over the lamp. The lower end of the flue is flared as shown to facilitate the entry of the hot air. The eggs are supported on the tray 14, the opening 17 being closed by a suitable cover 27, which latter is removed at the proper time to permit the chicks to escape into the nursery compartment below. The chicks are therefore not confined in the hatching compartment. The flue 13 passes through the nursery compartment and thus serves to heat the same also.

In order that the eggs may hatch properly, it is necessary that they be turned over occasionally, and to facilitate this operation, the tray 14 is made dished so that it slopes toward the center. The eggs surround the flue 13, and at suitable intervals those which are next to the flue are removed and placed in the outer circle, whereupon the others are automatically turned over and readjusted by rolling down the tray. By thus rearranging the eggs on the tray, they are warmed equally on all sides. The flue 13 has an asbestos jacket 28 to prevent the eggs and chicks from coming in direct contact therewith. The cover 6 may be sealed to the ring 7 by pasting a strip of paper 29 over the joint, and the ring can be sealed to the vessel by running plaster of Paris or some other sealing medium 30 over the joint. These seals can be readily removed when the vessel is to be uncovered to rearrange the eggs as herein described.

The apparatus herein described may also be employed as a brooder by removing the tray 14. The vessel 5 then serves as a hover compartment. An exercise and feeding compartment (not shown) will be provided to which the chicks have access through one of the openings 21, the glass covering said opening being removed.

In order that the chicks may pass out of the openings, the latter extend down to the floor or bottom of the vessel. The damper is supported by the ring 7, in view of which the cover 6 may be removed without disturbing the damper or the adjustment thereof.

I claim:

An incubator comprising a vessel which is open at the top, a removable ring fitting within said open top, a removable cover fitting in the ring, said cover having an opening, a flue extending into the vessel from the bottom thereof and in line with the aforesaid cover opening, an egg tray in the vessel, and an automatic damper carried by the ring and controlling the cover opening.

In testimony whereof I affix my signature in presence of two witnesses.

EMIL RUEGG.

Witnesses:
E. A. STUMPF,
MABEL G. WYLAND.